United States Patent [19]

Fiacconi

[11] Patent Number: 4,912,626
[45] Date of Patent: Mar. 27, 1990

[54] HIT PREDICTIVE CACHE MEMORY

[75] Inventor: Claudio Fiacconi, Arcore, Italy

[73] Assignee: Bull HN Information Systems Italia S.p.A., Caluso, Italy

[21] Appl. No.: 168,309

[22] Filed: Mar. 15, 1988

[30] Foreign Application Priority Data

Mar. 25, 1987 [IT] Italy ............................. 19832A/87

[51] Int. Cl.⁴ ............................................. G06F 12/12
[52] U.S. Cl. .............................. 364/200; 364/243.41; 364/246.11; 364/253
[58] Field of Search ... 364/200 MS File, 900 MS File

[56] References Cited

U.S. PATENT DOCUMENTS

| | | | |
|---|---|---|---|
| 4,363,095 | 12/1982 | Woods et al. | 364/200 |
| 4,445,177 | 4/1984 | Bratt et al. | 364/200 |
| 4,458,310 | 7/1984 | Chang | 364/200 |
| 4,603,380 | 7/1986 | Easton et al. | 364/200 |

Primary Examiner—Thomas M. Heckler

Attorney, Agent, or Firm—Faith F. Driscoll; John S. Solakian

[57] ABSTRACT

A cache memory when receiving an operand read request and the operand address from a central processing unit responds with a signal indicative of an operand being available in the cache memory before having checked if such operand is effectively in the cache or if in a previous operand request, the effective operand presence in the cache had occurred or started a memory read operation before having checked if such operand is effectively not present in the cache or if in a previous operand request, the effective absence of the operand from the cache has occurred. The decision among the two alternatives is determined by state logic which stores the previously occurred HIT condition denoting the requested operand presence in the cache or MISS condition denoting the requested operand absence from the cache memory. The states of these conditions are updated during the course of a current read operation if a predicted HIT condition is followed by an effective MISS condition or if a predicted MISS condition is followed by an effective HIT condition.

3 Claims, 3 Drawing Sheets

HIT PREDICTIVE CACHE MEMORY

BACKGROUND OF THE INVENTION

1. Field of Use

The present invention relates to a hit predictive cache memory.

2. Prior Art

It is known that cache memories are very fast memories, having small capacity, used in modern data processing systems to store portions of the working memory contents, which portions are from time to time, more frequently used or expected to be used. Cache memories essentially comprise an operand store section and an associative memory or contentable addressable memory (CAM) section for storing the addresses of the operands contained in the cache. If a central processor with its own cache needs an operand, the cache checks if the operand address coincides with one of the addresses stored in the CAM section. If this occurs, this means that the operand is stored in the cache which generates and forwards to the processor a "hit" signal and immediately thereafter sends the requested operand to the processor without any need to perform a read operation in the working memory.

If the requested operand is not stored in the cache, a read operation of the working memory is started by the cache which generally, in addition to transferring the operand read out from working memory to the processor, provides storage of the same operand in one of its memory locations by replacing an operand already contained therein.

Even if, within the cache, the address comparison operation requires only a very short time, in the order of few tenths of a nanosecond, in the modern data processing systems which use faster and faster microprocessors, such time may be excessive and may hamper the microprocessor's performance. That is, the microprocessor has to wait for the hit signal and the subsequent data availability.

The situation is further made worse in the modern systems which use a virtual memory. In such systems, the central processor addresses the operands with a logical address which has to be converted into a memory physical address by a memory address management unit.

In order to avoid system problems and cache complexity, the caches usually operate by comparing physical memory addresses. Between the instant of time at which a central processor generates an operand request, identified by a logical address and the instant at which the cache is ready to provide a hit signal, a time interval elapses which is the sum of the time required to convert the logical address into a physical address plus the comparison time of the cache associative memory. During this time interval, the central processor must generally stay idle and wait, with a consequent reduction in performance even if the central processor generally allows for a certain time delay between the reception of a signal confirming the next occurring availability of the operand (possibly the hit signal) and the effective operand availability.

SUMMARY OF THE INVENTION

The cache memory which is the object of the present invention, at least in part, overcomes the above disadvantages. The cache of the invention operates according to a hit predictive concept. In other words, the cache sends a prehit signal to the central processor requesting an operand before the physical operand address is compared with the CAM contents.

If after comparison, a hit occurs, the operand is made available. If the comparison is not successful, that is a "miss" occurs, the prehit signal is invalidated by a subsequent error signal which is forwarded to the central processor.

The prehit signal generation is not systematic, but is performed on the basis of the immediately preceding history of the operand requests. This history defines the status of a hit/miss indicator circuit. If the hit/miss indicator provides a prehit signal and thereafter the comparison is not successful and a miss occurs, the indicator is set to provide a premiss signal.

At the receipt of a next following operand request, the premiss indication allows the start of a memory access operation even if the requested operand may be present in the cache. If the operand is present in the cache, the indicator is set to generate a prehit signal and the operand read out from working memory, is delivered to the central processor.

If the operand is not present in the cache, once it has been read out from the main memory, it is not only delivered to the central processor, but it is also loaded into the cache. However, the prehit/premiss indicator is left in premiss state.

By this predictive mechanism the following advantages are achieved. In case of confirmed prehit, the access to an operand contained in the cache may occur without the introduction of wait states of the central processor. An operand request operation is repeated only in case where the prehit is not confirmed.

In case of premiss, the main memory read operations are started without waiting for a confirmation of the actual need to perform them. Since the operands, whether instructions or data, are mostly arranged in sequentially addressed blocks, most of the operand request operations result in the confirmed prehit condition and cache use is best exploited.

In the confirmed premiss condition situation, the use of main memory is best exploited. It is only when there is a change from one condition to the other is unnecessary time expended either by performing a working memory access, following a non-confirmed prehit, or for the superfluous execution of a memory access operation, following a non-confirmed premiss. In this way, the performance obtainable from a system including a central processor, a cache and a working memory is greatly increased.

The sequential arrangement of instruction operands is generally distinct from the sequential arrangement of data operands. Therefore, the prehit/premiss indicator is suitably arranged to provide a distinct or separate indication for data and for instructions.

DESCRIPTION OF THE DRAWINGS

The above features and the advantages of the invention will appear more clearly from the following description of a preferred form of embodiment of the invention when considered with the following drawings.

DESCRIPTION OF THE PREFERRED EMBODIMENT

Figure 1:
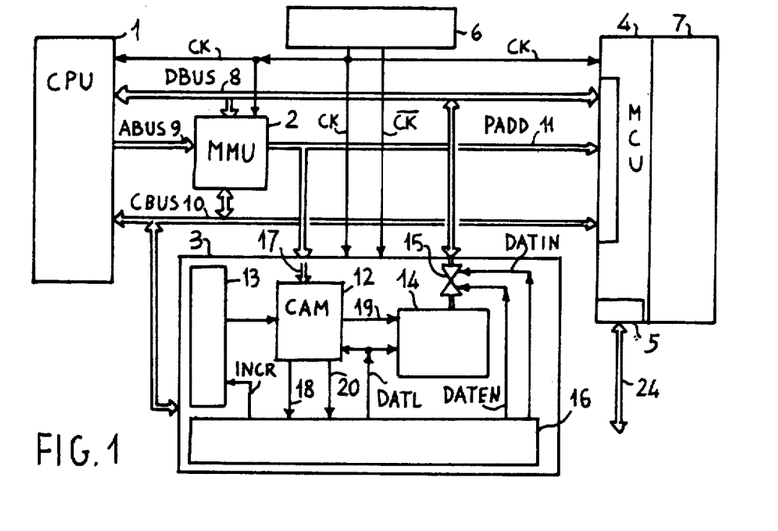
FIG. 1 shows in block diagram form, a data processing system including the predictive cache of the invention.

FIG. 1 shows in block diagram form, the data processing system including the predictive cache of the invention. The system comprises a central processing unit or CPU 1, a memory address management unit or MMU 2, a cache memory 3, a memory control unit or MCU 4, an oscillator 6 for generating a periodic timing signal, and a working memory 7. CPU 1 and MM 2 may be implemented in several ways, but for clarity of description, it is advantageous to refer to a CPU 1 as consisting of a microprocessor, such as MC68020, manufactured by Motorola Inc. and to the related MMU consisting of the integrated circuit MC68851.

At the block diagram level of FIG. 1, the system architecture is conventional. CPU 1 is connected to the working memory 7 for information transfer (read/write) through a bidirectional data bus DBUS 8. The memory address specifying where to peform the transfer is supplied by CPU1 on a channel ABUS 9 and is received by MMU 2 which converts the virtual address into a physical memory address, present on a channel PADD 11 which connects MMU 2 to MCU 4. Control signals are exchanged among CPU 1, MMU 2, cache 3 and control unit 4 through a control bus CBUS 10.

Cache memory 3 is further connected to channel PADD 11 for receiving addresses and to a channel DBUS 8 for receiving or outputting information. Channels DBUS 8, PADD 11, CBUS 10 together constitute a communication port for the control unit 4, which is preferably of the two port type. It is provided with a second port 5 connected to a communication channel 24 for connection to input/output processors and generically to peripheral control units. MCU 4, in known manner, resolves conflicts in the access requests received from the two ports according to suitable priority criteria.

Figure 2:
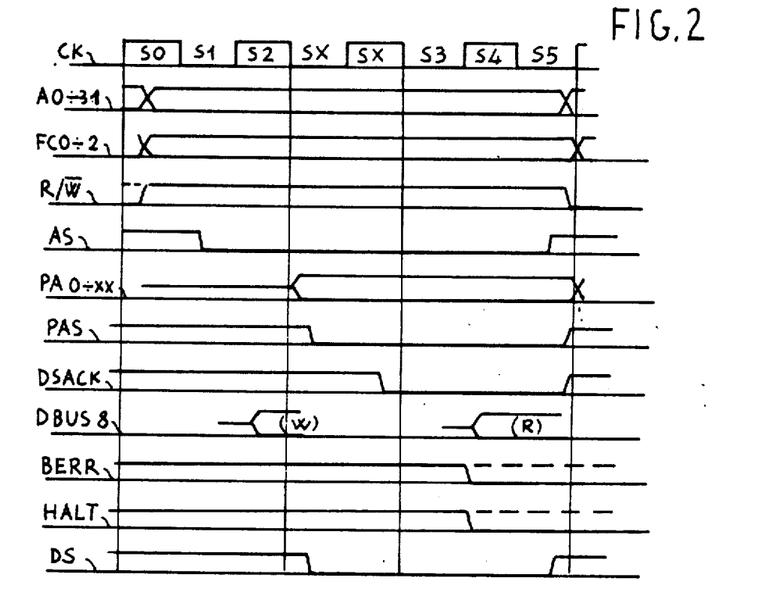
FIG. 2 shows in timing diagram form, the several signals which control read and write memory operations and which are exchanged between the central unit and the working memory or the cache in the system of FIG. 1.

For a better understanding of the invention, the timing diagrams of FIG. 2 summarize the operation of CPU 1 and MMU 2 for memory transfers. The operation of CPU 1 develops during the course of timing cycles defined by the periodic clock signal CK, generated by oscillator 6, along with a negated clock signal $\overline{CK}$. Signal CK has, by way of example, a period of 60 nsec which comprises two square wave half periods of 30 nsec each. Each half period defines a working state of the CPU.

A memory read operation requires 6 working states and a variable number of wait states, depending on the speed at which the memory can fulfill the CPU 1 request. During a first state S0, CPU 1 places a logical address A0-31 on the address channel and a set of control signals on the control channel.

Among such signals, there is a signal R/W set at a logic 1 level to indicate a read operation and signals FC0-2 which, depending on their logic level, define the nature of the requested operand as a user data, a user program instruction, a supervisor data or a supervisor program instruction. During state S1, CPU 1 switches a strobe signal AS to a logic 0 to validate the signals present on the address and control channels.

MMU 2 receives the logical address A0-31, the function code FC0-2 and strobe signal AS. Within a maximum delay of 45 nsec from receipt of the logical address, it applies to channel PADD, the physical address PAO-XX corresponding to the logical address and lowers the state of a strobe and validation signal PAS on a miscellaneous lead. This event occurs in the state SX which immediately follows state S2.

If CPU 1 does not receive a signal DSACK at logic 0 level, it is placed in wait state SX comprised of one or more clock periods. Signal DSACK when received by CPU1, guarantees to the CPU1 that the requested information will be available on the data bus with a delay, not exceeding one clock period.

When signal DSACK is received, CPU 1 moves to states S3 and S4. At the end of state S4, it loads the information present on data bus, into an internal register. This is performed only if a signal BERR is set to a logic 1 level on a control lead to indicate that the read operation has been correctly performed and no error is present in the read out data. In case of error, the BERR signal must be lowered to a logic 0 level at least 20 nsec before the transition from state S4 to state S5.

Once the read operation is concluded, during state S5, CPU 1 raises again signal AS to a logic 1 and removes the address and the commands from the respective channels. When receiving AS=1, MMU 2 and the unit which has generated the DSACK signal (MCU 4 or cache memory 3) must respectively raise signals PAS and DSACK to logic 1 levels.

If, together with signal BERR=0, the CPU 1 receives also a signal HALT=0, CPU 1, at the conclusion of state S5, performs a rerun or retry operation. That is, it tries again or repeats the previous read operation.

Substantially similar is the operation performed in case of a write transfer. The only difference in this case is that CPU 1 puts the operand to be written on data channel DBUS 8, during state S2 (Diagram DBUS (W). During the course of the next following state, it lowers to a logic 0, a signal DS on a control lead to indicate that the data is present on the bus. Signal DS is raised to a logic 1 during state S5 together with strobe signal AS.

From the preceding summary, it appears that in order to operate with CPU1, MCU 4 needs an input/output data channel, an address input channel, an input signal for memory activation which may be performed by signal AS or PAS, an input for signal R/W and possibly signal DS. It must be capable of generating a signal DASTRO which performs the function requested to signal DSACK, that is, guarantee that the read out information will be available within a delay not exceeding 60 nsec (a clock period) relative to the transition of signal DASTRO from a logic 1 to a logic 0. MCU 4, as well as memory 7 may be of a conventional type and does not require any more detailed description.

It will be noted that even if a read or write operation is performed by CPU 1, this only requires as a minimum, 6 states, that is 180 nsec, the time interval between the availability of the logical address, validated by signal AS=0, and the need to have a read out data available on DBUS 8 channel which only requires 3 states (i.e., states S2, S3 and S4).

It is known that in currently used dynamic memories, organized in rows and columns, it is possible to start a memory cycle even if the only address portion known is the portion corresponding to a row address. The address portion corresponding to a column address may be rendered available at a subsequent time.

It is also known that in virtual memory systems, the conversion from logical to physical address only affects the address field and that portion which identifies a memory row address may be expressed with a logical address which coincides with a physical address. Memory 7 could therefore start a memory cycle on receipt of signal AS=0. However, even so, it should be capable of completing the read operation in the course of three states, that is, within 90 nanoseconds.

This operation time, at the present state of the technology, is unattainable. And, dynamic memories of large capacity and low cost are only manufactured with memory cycles in the order of 200 nanoseconds.

The introduction of a wait state, in the operation of CPU1 is therefore unavoidable, or a cache memory, such as memory 3 is required to overcome this inconvenience. Cache memory 3 essentially comprises a content associative memory or CAM 12, having an internal comparator, a cyclic counter 13, a fast read/write memory 14, a set of bidirectional tristate gates 15 and a control logic 16. Because the invention essentially resides in the control logic 16, only a brief description of the other functional elements is provided.

Through a loading process which will be described hereinafter, a physical memory address is loaded into the associative memory 12, at each addressable location. At the same time, the operand in the working memory which is present at the same physical address, is loaded into a corresponding location of fast memory 14. Fast memory 14 is therefore a partial copy of the working memory. A list of each of the addresses of the operands stored in fast memory as related thereto is stored in CAM 12.

When CPU 1 interrogates the working memory 7 and the cache memory 3 during a read operation, the physical address present on channel PADD 11 is transferred to CAM 12 and compared simultaneously with all the addresses stored in CAM 12. In case of successful comparison, CAM 12 outputs a "HIT" signal on lead 18 and an address code on output channel 19. In addition to indicating which is the particular CAM 12 location for which a hit occurred, such address code enables the selection of that particular memory 14 location where the related operand is contained. Such operand may be read out and transferred on channel DBUS 8 through gates 15.

It is clear that in the hit case, the working memory 7 is not activated. On the contrary, in case of unsuccessful comparison, CAM 12 outputs a "MISS" signal to indicate that the requested operand is not contained in fast memory 14. In this case, it is required to start a working memory 7 read operation and to update the contents of the cache memory 3.

The so-called FIFO method may be used. Cyclic counter 13 outputs an address code to CAM 12 decreased by one indicating which has been the last CAM 12 location and the corresponding last memory 14 location to be loaded. Therefore, the code indicates which location among the several locations has been the first to be loaded.

In case of a "miss", the physical address present on channel PADD is loaded into the CAM12 location pointed by cyclic counter 13 and thereafter the counter is incremented by one. The preexisting information stored therein is therefore erased. Furthermore, the operand made available by working memory 7 on channel DBUS 8 is loaded in the memory 14 location corresponding to the updated CAM 12 location.

The architectural arrangements which enable one to reduce the number of constituent components of CAM 12 are beyond the scope of the invention. It suffices to note that control logic 16 which receives signals HIT and MISS, must provide an increment command INCR to counter 13, a write command DATL to memory 14 and control signals (DATIN-DATEN) to bidirectional gates 15 to enable them to cause a transfer in one direction or the other. Typically, CAM 12 may have a maximum response time in the order of 30 nsec and the fast memory 14, a maximum response time in the order of 25 nsec.

As a consequence of the physical addresses being available at least during the first half of state S2, an operand present in fast memory 14 can be made available on channel DBUS 8 in state S4 without need of wait states, and the hit signal can be made available in state S3. Therefore, in case of hit, CPU1 may virtually obtain the requested operand from cache memory 3, with a read operation performed within six subsequent states S0–S5 and without wait states.

However, it is required that the CPU 1 be provided with signal DSACK=0 during state S2 and such signal cannot originate from the hit signal, because this signal is only available in state S3.

Hence, there is the need to use a predictive HIT signal which is issued in advance and is only later confirmed or not confirmed.

Figure 3:
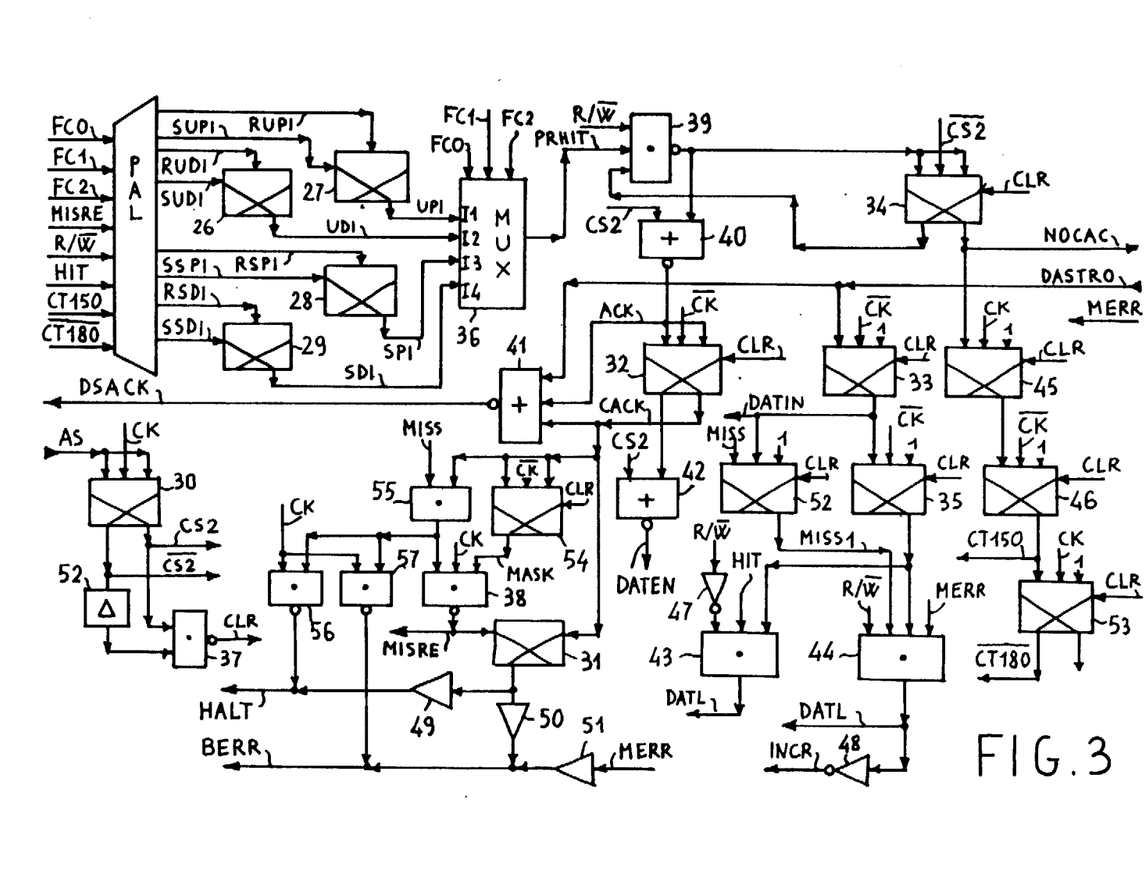
FIG. 3 shows in circuit diagram form, the control logic for the predictive cache of the invention.

The control logic 16 shown in FIG. 3 provides such signal as a function of previously occurred events. The control logic 16 of FIG. 3 comprises a decoder 25, fifteen JK flip-flops 26 through 35, 45, 46 and 52-54, a multiplexer 36, three NAND gates 37-39, three NOR gates 40-42, three AND gates 43-45, two inverters 47 and 48, three open collector drivers 49-51, a delay element 52 and two open collector NAND gates 56 and 57.

Figure 4:
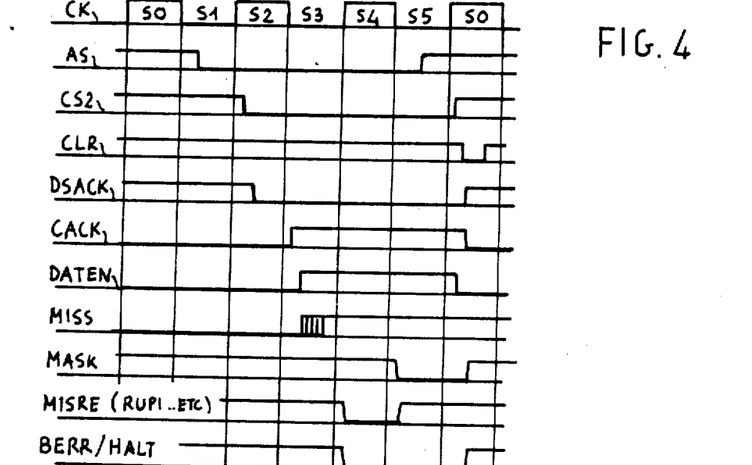
FIG. 4 shows in timing diagram form, the signals which are exchanged between the central unit and the cache in the system of FIG. 1, in case of hit prediction by the cache.
Figure 5:
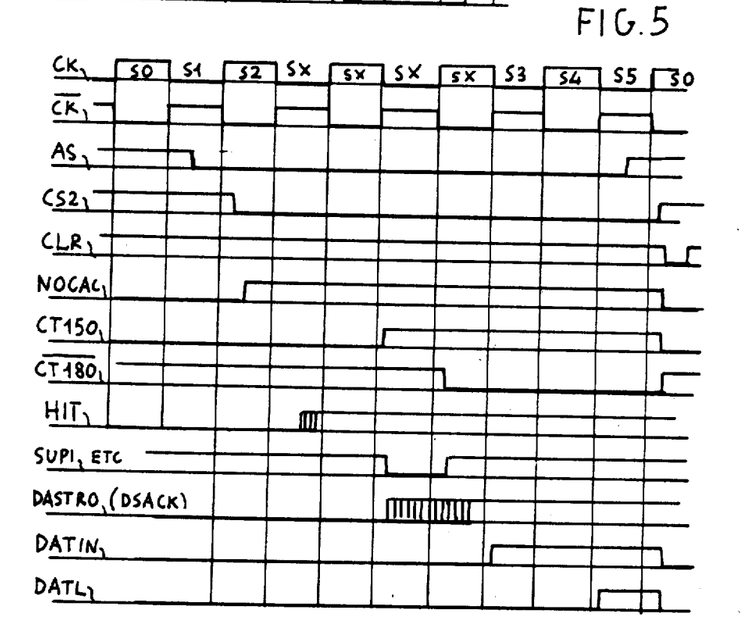
FIG. 5 shows in timing diagram form, the signals which are exchanged among the central unit, the cache and the working memory in case of miss prediction by the cache.

The operation of the control logic 16 may be more easily understood with reference to FIG. 3 and to FIGS. 4 and 5 which show in timing diagram form, the status of several components shown in FIG. 3 and the signal levels present at some points of the control logic for different operating conditions. Flip-flop 30, delay element 52 and NAND gate 37 constitute timing logic which define an active state for the cache. Flip-flop 30 receives CPU 1 generated signal AS, at the J,K inputs and signal CK at the clock input.

Therefore, when CPU1 controls an external operation and drops signal AS to a logic 0 during state S1, flip-flop 30 which is normally set, is reset on the next following leading edge of CK, that is, at the beginning of state S2. At the same time, a signal CS2 at logic 0 level is produced at the direct output of flip-flop 30. This signal is maintained until the first leading edge of the CK clock signal following the next time that signal AS is raised to a logic 1 level, that is, until the end of CPU 1 state S5. During this time interval, a number of wait states may occur between state S2 and state S3, which depends on the time at which CPU 1 receives signal DSACK set at a logical 0 level.

Upon the return of flip-flop 30 to a set state, the signal present at the inverting output of flip-flop 30 drops to a logic 0 and after a delay imposed by element 52 is applied to an input of NAND 37 which receives at a second input, signal CS2 which is already at a logical 1 level.

Therefore, upon signal CS2 being raised again to 1, a short pulse CLR at a logical 0 level appears at the output of NAND 37. This output is normally at a logic 1 level. This pulse is used to reset the several elements of the control logic 16 which ends each activation cycle of the control logic.

FIG. 4 shows in timing diagram form, the status of signals CK, AS, CS2 and CLR. Decoder 25, flip-flops 26–29 and multiplexer 36 form a hit prediction and hit updating logic. Flip-flops 26–29, when set, indicate that in the course of a read operation preceding a current read, a hit had occurred between physical memory address and an address stored in the CAM 12, respectively for an address pertaining to a user data field (flip-flop 26) a user program field (flip-flop 27) a supervisor program field (flip-flop 28) or a supervisor data field (flip-flop 29). The output signals from the direct output of flip-flops 26, 27, 28 and 29, respectively UDI, UPI, SPI and SDI, are applied respectively to the inputs I2, I1, I3 and I4 of multiplexer 36 which receives function code FCO-2 at its control and selection inputs.

Therefore if, in the course of a current operand request from external source, CPU 1 generates the function code FCO-2=100 to indicate that the requested operand is a user data (pertaining to the user data field), multiplexer 36 selects and outputs signal UDI present at input I2. If UDI signal is at a logic 1 level, it indicates that during the course of a preceding operand request, a hit had occurred; that is, the operand was contained in the cache.

In a general way, for each operand request issued by CPUI, multiplexer 36 outputs a signal PRHIT at logic 1 level to indicate that an operand of the same nature (user program data/instruction, supervisor program data/instruction) had been previously found in the cache, or outputs a signal at logic 0 level to indicate that an operand of the same nature had not been previously found in the cache. Signal PRHIT, the result of the selection operation performed by multiplexer 36 in response to function code FCO-2, is already available during state S1 and is inputted to NAND 36, together with signal R/W, generated by CPU1 and indicates when set at logic 1 level that the requested operation is a read.

NAND gate 39 receives a signal NOCAC at a third input. NOCAC is normally at a logic 1 level. The output of gate 39 is therefore at a logic 1 level for a write operation and depends on the status of PRHIT signal for a read operation.

The case in which PRHIT=1 and R/W=1 (read operation with prehit) will now be considered. In this case, as shown in the timing diagram of FIG. 4, the output of gate 39 is at a logical 0 level. The output of gate 39 is connected to an input of NOR gate 40 which receives signal CS2 at a second input. Therefore, as soon as signal CS2 falls to a logic 0, the output of gate 40 rises to a logic 1 and outputs a signal ACK=1 which is inputted to a NOR gate 41.

The output of NOR 41 falls to a logic 0 and outputs a signal DSACK=0 which is forwarded to CPU1 to indicate that the requested operand will soon be available. The falling of signal DSACK to 0 clearly occurs during state S2 (FIG. 4 diagram DSACK). Signal ACK=1 is a further input to the J,K inputs of flip-flop 32 which is normally reset.

Flip-flop 32 is set on the rising edge of signal $\overline{CK}$, corresponding to the beginning of state S3 and generates as the direct output, a signal CACK=1 which is applied to a second input of NOR gate 41 and holds signal DSACK at a logic 0 level even if PRHIT signal drops to a logic 0 level. The inverting output of flip-flop 32 is connected to an input of NOR gate 42 which receives signal CS2=0 at a second input. Thus, in state S3, signal DATEN (FIG. 4) at the output of gate 42 rises to a logic 1 level and enables tristate gates 15 to transfer the information read out from fast memory 14 onto data channel DBUS 8.

The address to fast memory 14 is obviously provided by CAM 12 which in turn receives, from channel PADD 11, a valid physical address at least during state S2. It is therefore able to provide a selection address for the fast memory 14 at least during state S3, together with a HIT or MISS signal. In case of HIT, the operand request operation is concluded by CPU 1 reading the information transferred from fast memory 14 onto data channel DBUS 8. This occurs during state S4.

During state S5, CPU 1 raises signal AS to a logic 1. This has the effect of disabling tristate gates 15 because signal DATEN falls to a logic 0. Immediately thereafter, on the rising of signal CK (end of state S5) to a logic 1, signal CS2 rises again to a logic 1 and signal CLR resets flip-flop 32. As a consequence, signal DSACK rises again to a logic 1.

In case of MISS=1 generated within state S3, MISS signal, inputted to AND 55 together with signal CACK, raises the output of gate 55 to a logic 1 which is connected to an input of each of NAND gates 56, 57, and 38. Gates 56 and 57 receive signal CK at a second input and have their outputs connected to control channel leads for transferring respectively signals HALT and BERR to CPU 1.

Gate 38 receives signal CK and a MASK signal, normally set at a logic 1 level, at second and third inputs respectively. Therefore, at the beginning of state S4, in case of signal MISS=1; that is, the absence of the request operand from the cache, a signal MISRE=0 (FIG. 4) is generated at the output of gate 38. At the same time, signals HALT and BERR are dropped to logic 0S.

Signal MISRE is an input both to decoder 25 and to the reset input of flip-flop 31. When signal MISRE=0, decoder 25 raises one of its outputs depending on the value of function code FC0-2 present at the input, corresponding to one of the signals RUPI, RUDI, RSPI and RSDI, respectively. These signals are applied to the clock inputs of flip-flops 27, 26, 28 and 29 respectively.

The J,K inputs of such flip-flops are connected to a logic 0 level so that they are reset on receipt of corresponding ones of the clock signals (RUPI, RUDI, RSPI and RSDI). Therefore, the flip-flop indicator related to the data/instruction field identified by the current function code FC0-2 is reset. Signal MISRE=0, an input to the set input of flip-flop 31, resets it.

The inverting output of flip-flop 31 is connected to the inputs of drivers 49 and 50, each having an output, of the open collector type, connected to the control channel leads used to transfer signals HALT and BERR respectively, and keeps signals BERR and HALT at logic 0 levels even after the termination of clock pulse CK and until the end of state S5. With the resetting of flip-flop 32, whose direct output is connected to the reset input of flip-flop 31, these signals are raised again to logic 1 levels. Signal MISRE, on the contrary, rises to a logic 1 at the end of state S4, due to the dropping of signal CK to a logic 0.

Flip-flop 54, which has J,K inputs connected to the direct output of flip-flop 32 to receive signal CACK, has the function of generating a masking signal which prevents at the end of state S5 and at the beginning of the next following state S0, when flip-flop 32 has not been reset, due to unavoidable propagation times, signal MISRE at the output of gate 38 from being dropped by the clock pulse CK corresponding to state S0. Flip-flop 54 is reset by signal CLR received at the reset input.

To summarize, it must be noted that in both cases (HIT, MISS), the memory access request is "captured" by the cache memory 3 which, in one case supplies the requested information without modifying the status of the hit prediction logic (flip-flops 26–29). In the other case, it generates the BERR and HALT signals and updates the status of the hit prediction logic. Upon receipt of the error (BERR) signal, the CPU1 performs a "rerun" operation, that is it retries the read operation at the same address.

It is of interest to consider how the control logic of FIG. 3 responds to this request, and more generally how it operates in case of a read operation when the prediction logic indicates a MISS situation. The operation is shown in the timing diagram of FIG. 5.

As soon as signal AS=0 is received, the previously considered timing logic is activated and at the beginning of state S2, signal CS2 is dropped to a logic 0. In this case, the PRHIT signal is at a logic 0 level, because the corresponding hit indicator has been reset. The output of NAND gate 39 is connected to the JK inputs of flip-flop 34 which receives at the clock input, signal CS2 present at the inverting output of flip-flop 30. Since the output of gate 39 is at a logic 1 level, flip-flop 34 is set at the beginning of state S2 and generates a signal NOCAC at the direct output (FIG. 5). Signal NOCAC is forwarded to the memory control unit 4 as a memory access request.

After a period of time which depends on the duration of the memory cycle and also on the circumstance that the memory access request can be immediately honored or queued to other running or pending access requests (assumption has been made that MCU 4 is double port type), the MCU 4 responds to the request by raising signal DASTRO to a logic 1 level. Signal DASTRO is applied at an input of NOR gate 41 which outputs signal DSACK=0 to CPU1. Signal DASTRO is applied to the J input of flip-flop 33, which has the K input connected to a logic 0 level. Flip-flop 33 receives at the clock input, inverted signal $\overline{CK}$ generated by oscillator 6.

Therefore, on the first rising edge of $\overline{CK}$ following the reception of DASTRO, and corresponding in the CPU1 to the beginning of state S3, flip-flop 33 is set and a signal DATIN is raised at its direct output. Signal DATIN enables bidirectional gates 15 to transfer the information present on channel DBUS 8 into fast memory 14 at the address pointed by cyclic counter 13. Signal DATIN is further inputted to the clock input of flip-flop 52 which receives at the J input, the signal MISS generated by CAM12.

In case where signal MISS=1, flip-flop 52 is set and generates a signal MISS1=1 at the direct output. Signal DATIN is also applied to the J input of flip-flop 35 which receives signal $\overline{CK}$ at the clock input and a logic 0 level at the K input.

At the rising edge of signal $\overline{CK}$ following the one which set flip-flop 33, that is, at the end of CPU 1 state S4, flip-flop 35 is also set and its direct output rises to a logic 1 level.

The direct output of flip-flop 35 is connected to an input of AND gate 44 which receives signals MISS1, MERR and R/W at other inputs. MISS1 is generated by flip-flop 52 while signal R/W is generated by CPU1. Signal MERR is generated by MCU4 together with the data read out from memory and is at a logic 1 level in case of no error in the data.

Thus, if the requested information is not contained in the cache and therefore signal MISS=1 and the memory operation has been correctly performed and therefore signal MERR=1, the output of gate 44 rises to a logic 1. This generates a signal DATL which is forwarded to CA 12 and to the fast memory 14 in order to load (at the occurrence of signal DATL rising edge) the address present on channel PADD and the data present on channel DBUS 8 into CAM 12 and memory 14 respectively, the memory 14 addressed location being identified by cyclic counter 13.

At the end of CPU state S5, signal CLR resets flip-flops 33, 35 and 52. They drop to logic 0 levels, signals DATIN, DATL and MISS1 respectively. Signal DATL generates through inverter 48 the signal INCR, which by its rising edge at the end of state S5 causes the cyclic counter 13 to increment. In case of a read error, the updating operation of the associative memory contents is not performed and signal MERR=0 is transferred through driver 51 to CPU 1 for suitable error handling.

In the preceding case of "rerun", that is, a memory read following a non confirmed prehit, it is clear that signal MISS is necessarily at a logic 1 level, and it will be noted that the states of the prehit indicators 26, 27, 28 and 29 are not modified.

The case will now be considered in which the prehit indication is false (PRHIT=0) and therefore a read memory operation is immediately started, but in the course of its execution, CAM 12 provides a HIT indication. Therefore, the requested information is already in the cache.

In this case, the memory read operation proceeds normally but no contents updating is performed in the cache. In fact, signal MISS=0 inhibits the generation of signals DATL and INCR. By reverse, an updating operation is performed of the prehit indicators status. To this purpose, signal NOCAC is applied to the J input of flip-flop 45 which receives signal CK at the clock input and signal CLR at the reset input.

The direct output of flip-flop 45 is connected to the J input of flip-flop 46 which receives signal $\overline{CK}$ at the clock input and signal CLR at the reset input. The direct output of flip-flop 46 is connected to the J input of flip-flop 53 which receives signal CK at the clock input and signal CLR at the reset input. Flip-flops 45, 46 and 53 operate as a shift register.

When signal NOCAC is raised to a logic 1, flip-flops 45, 46 and 53, normally reset, are set in sequence at each transition of signal CK. At the direct output of flip-flop 46, a signal CT150 is raised to a logic 1 level 150 nsec following the beginning of state S0. At the inverting output of flip-flop 53, a signal CT180 drops to a logic 0 level, 180 nsec following the beginning of state S0. The two signals are both at logic 1 levels during a time interval of 30 nsec in which the hit signal, in case of hit, is present in a stable condition.

Signals CT150 and CT180 are inputs to decoder 25 together with signals R/W̄ and HIT. The joint presence of such signals at logic 1 levels causes the generation by decoder 25 of one set pulse at a logic 0 level among four possible set pulses SUPI, SUDI, SSPI and SSDI depending on the value of function code FCO-2 at the input to the decoder 25. Therefore, if the instruction under execution is related to a user program instruction, pulse SUPI=0 is generated. Signal SUPY is applied to the set input of flip-flop 27 and sets it. In order to prevent the change in indicator state from providing a prehit indication through multiplexor 36 in the course of the current read operation and the consequent activation of flip-flop 32, NAND gate 39 has an input connected to the inverting output of flip-flop 34.

Even if not relevant to the scope of the invention, it is advisable to consider the operation of the control logic 16 in case the CPU 1 requests memory write operations. In this case, it is essential to guarantee that the contents of the cache memory coincide with the contents of the working memory. Therefore, signal R/W̄=0, an input to NAND gate 39, causes the setting of flip-flop 34 and the start of a memory cycle.

In addition, if the write address is an address contained in CAM 12 and consequently the HIT condition is verified, flip-flops 33 and 35 are set when signal DAS-TRO=1 is received from MCU 4. The direct output of flip-flop 35 is connected to an input of AND gate 43 which receives as inputs signals HIT and R̄/W obtained from passing signal R/W̄ through inverter 47. AND gate 43 outputs signal DATL.

Therefore, the information present on channel DBUS 8, in addition to being written in the working memory, is also written into the cache (and more precisely into memory 14) at the address specified by CAM 12. The described method is known as "write through".

It is clear that the cache memory and particularly the control logic which has been described with reference to the drawings is only a preferred form of embodiment of the invention and that several changes and additions can be made to it. For instance, flip-flops 45 and 53, as well as flip-flops 33 and 35, may be substituted with shift registers. The logic levels of the signals may be changed in whole or in part and consequently the logical function performed by the several gates will have to be adapted to the different circumstances.

In addition, if it is foreseen at software level that I/O processors can access to the same memory fields used by CPU 1 and it is desired to avoid the use of memory block protection at software level, it is possible to add "watching" circuits to the cache control logic. "Watching" circuits monitor the write operations performed by I/O processors within the working memory, so that if such operations modify information which is also contained in the cache memory, such information is also modified in the cache or invalidated.

Likewise, the HIT prediction logic which provides prehit/premiss indications, separately for data/instructions of supervisor/user programs so as to fully exploit the performance offered by the particular used microprocessor (MC68020) may be simplified to provide a specific prehit signal for only two categories of operands (data-instructions) or more simply, even if less efficaciously in term of performance increase, a single prehit signal for both data and instructions.

Other changes may relate to the prehit, premiss concepts, which may be used only in partial way. For instance, it is possible to arrange for a control logic which provides a prehit signal in case of previous hit, but that in case of premiss does not start immediately a memory read operation and waits for the result of the comparison performed in the associative memory. In this case, the memory read operation may be activated only in case of effective miss, that is in case of effective need. In case of hit, the requested information may be provided by the cache.

For the purpose of rendering clearer, the wording of the appended claims, it will be also noted that signals CS2 and C̄S̄2̄ whose generation is unequivocally determined by signal AS generated by CPU 1 in synchronism with clock signal CK, may be considered as being generated or derived from CPU 1 and constitute an address strobe signal synchronized with the clock signal.

What is claimed is:

1. A hit predictive cache memory including an associative memory containing addresses of operands stored in a working memory and a fast memory containing the operands corresponding to said addresses, said associative memory when interrogated by a central processing unit providing a hit or miss signal respectively to indicate when a requested operand is actively present or not present in said fast memory, said predictive cache memory further comprising:
    control logic means comprising at least a storage element for storing a hit or miss condition occurring during a preceding interrogation of said cache memory and for providing as an output, a corresponding prehit premiss indicator signal;
    first logic circuit means coupled to receive memory read interrogation signals from said central processing unit, and said indicator signal from said control logic means, said first logic circuit means providing a signal indicative of operand present in said cache memory to said central processing unit irrespective of the actual presence of said operand when said indicator signal is a prehit indicator, said actual presence of said operand in said cache being subsequently confirmed or non-confirmed by said associative memory; and
    second logic circuit means coupled to receive said miss signal from said associative memory and said signal indicative of operand present in said cache memory from said first logic circuit means, said second logic circuit means generating an error signal for delivery to said central processing unit and a reset signal to said storage element of said control logic means in response to the joint receipt of said miss signal and said signal indicative of operand being present in said cache memory.

2. The hit predictive cache memory of claim 1 wherein said control logic further comprises:
    third logic circuit means being coupled to receive said memory read interrogation signals from said central processor, and said indicator signal from said control logic means, said third logic circuit means generating a memory start signal for transfer to said working memory for reading out an operand from said working memory, irrespective of the absence of said operand from said cache memory when said indicator signal is a premiss indicator, the absence of said operand from said cache memory being subsequently confirmed or not confirmed by said associative memory; and fourth logic circuit means being connected to receive said memory start signal from said third logic circuit means and said hit signal from said associative memory, said fourth logic circuit means generating a set signal in response to the joint receipt of said hit signal and said memory start signal for storing said hit condition in said storage element of said control logic means.

3. The hit predictive cache memory of claim 2 wherein said control logic further comprises:

fifth logic circuit means being connected to receive a signal indicative of an operand available from said working memory and said miss signal from said associative memory, said fifth logic circuit means generating a load signal in response to the joint receipt of said miss signal and said signal indicative of operand available for loading said associative memory and said fast memory.

* * * * *